United States Patent Office 3,554,714
Patented Jan. 12, 1971

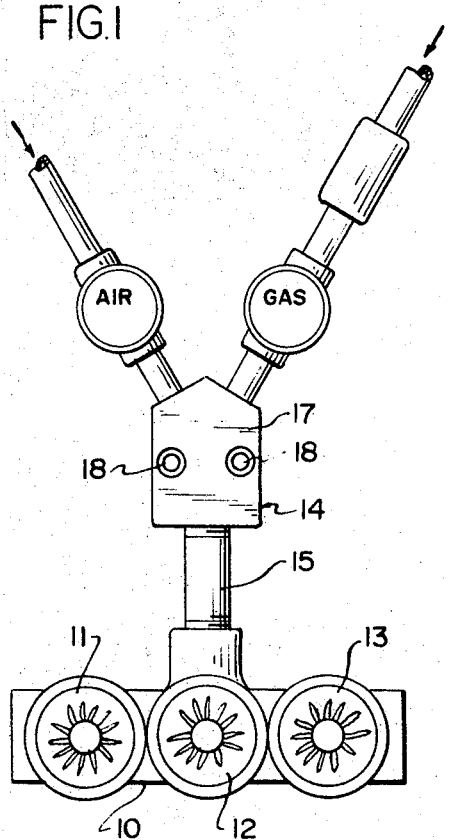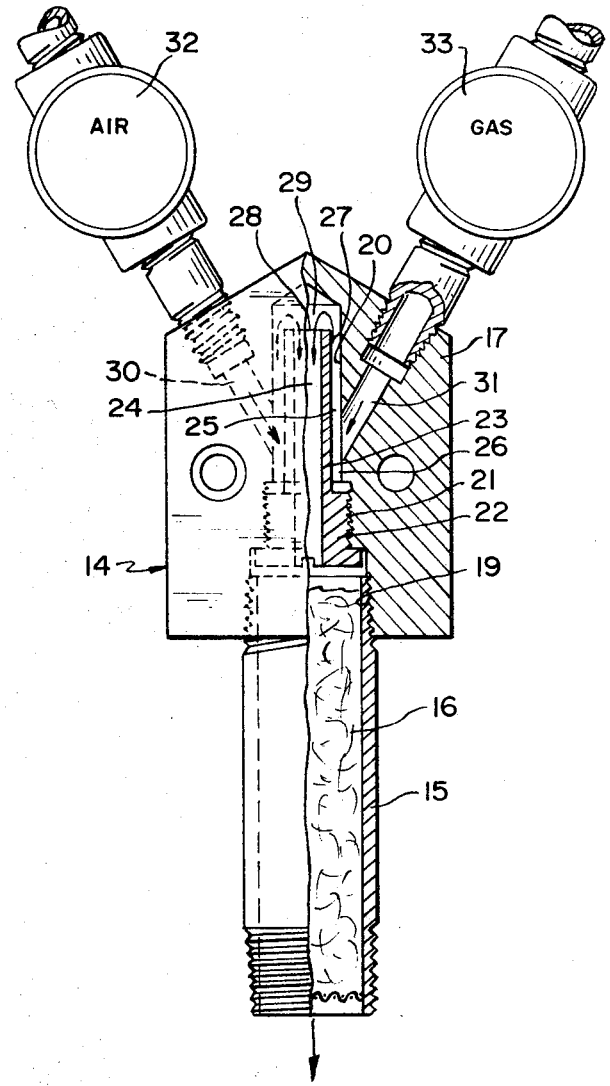

3,554,714
AIR-GAS MIXING DEVICE
Richard S. Johnson, Racine, Wis., assignor to Modine Manufacturing Company, a corporation of Wisconsin
Filed July 3, 1968, Ser. No. 742,393
Int. Cl. F23d 13/40
U.S. Cl. 48—180
6 Claims

ABSTRACT OF THE DISCLOSURE

An air-gas mixing device having an elongated annular first mixing chamber and an axial flow passage receiving fluid from said chamber, a first passage means for introducing air into the annular chamber adjacent a first end thereof, a second passage means for introducing gas into the annular chamber also adjacent this first end, the first and second passages being arcuately spaced from each other and a second mixing chamber between the second end of the annular chamber and the axial flow passage. The first chamber is axially adjacent the flow passage with the result that the air-gas mixture flowing from the annular chamber through the second chamber and into the axial flow passage makes a sharp turn (preferably an approximately 360° turn). Because mixing takes place immediately on introducing the air and gas to the annular chamber, then mixes further in flow through the annular chamber and mixes more thoroughly in flow through the second mixing chamber into the axial flow passage including the sharp turn, a very thorough mixing of the air and gas is achieved in a very small space.

---

One of the features of this invention is to provide an air-gas mixing device in which the mixing is so thorough that the device may be kept quite small and therefore relatively inexpensive with the result that each burner or bank of burners may have its own air-gas mixing device.

Other features and advantages of the invention will be apparent from the following description of one embodiment thereof taken in conjunction with the accompanying drawings. Of the drawings:

FIG. 1 is a front elevational view illustrating a mixing device embodying the invention in conjunction with air and gas flow lines and a bank of three gas burners.

FIG. 2 is an enlarged partially sectioned view similar to FIG. 1 but illustrating a portion of the structure of FIG. 1.

In the embodiment shown in the drawings there is illustrated a bank 10 of three burners 11, 12 and 13. These burners are provided with a substantially homogeneous mixture of air and gas from a mixing device 14 embodying the invention by way of a pipe 15 containing the customary steel wool flame arrester 16.

The mixing device 14 is in the form of a block 17 having a pair of mounting screw holes 18 on opposite sides thereof. The bottom of the block 17 is provided with a threaded opening 19 to which is attached one end of the pipe 15.

Extending upwardly from the opening 19 is a chamber 20 having an enlarged lower end 21 into which is threaded the base 22 of a tube 23. This tube 23 has a central axial flow passage 24 and an outer surface spaced from the chamber wall 20 to provide an annular first mixing chamber means 25. As shown in the drawings the mixing chamber 25 has a first or inner end 26 and a second or outer end 27 that is adjacent the entrance 28 to the flow passage 24.

Located between the second end 27 of the annular mixing chamber 25 and the entrance 28 to the flow passage 24 is a second mixing chamber means 29. This second mixing chamber is of relatively large volume capacity in that it has a cross sectional area in a transverse direction (horizontally as viewed in FIG. 2) that is greater than the cross sectional area of either the annular mixing chamber 25 or the axial flow passage 24.

The mixing device block 17 contains a first passage means 30 for introducing air into the annular chamber 25 adjacent the first end 26 thereof. The block 17 also contains a second passage means 31 for introducing gas into the annular chamber 25 also adjacent the first end 26 thereof. The first and second passage means 30 and 31 are arcuately spaced from each other adjacent the annular mixing chamber 24 and in the illustrated embodiment this arcuate spacing is substantially 180°.

With the structure as defined the air and gas mixture flowing through the annular chamber 25, through the second mixing chamber 29 and into the flow passage 24 makes an approximately 360° turn.

In the illustrative embodiment each of the first 30 and second 31 passages that supply air and gas to the device 14 is at an acute angle to the axial flow passage 24 and thus to the first mixing chamber 25 with this acute angle being measured in the direction of the second mixing chamber 29, and in the illustrated embodiment each of these angles is approximately 45°.

The result of the above construction is that the air and gas flowing into the annular chamber 25 achieve immediate mixing in the annular first chamber 25. Mixing is more pronounced as the air and gas flow up the annular chamber into the second mixing chamber 29 where further mixing occurs. Then, by the time the air and gas have reversed their flow substantially 360° as explained above and entered the axial flow passage 24 mixing is substantially complete.

The result is that very thorough mixing can be achieved in a very small space. This is illustrated by the fact that the device as shown in FIG. 2 is approximately full scale for supplying the bank of three burners 11–13. This thorough mixing in a very small space is rapid and quite efficient so that by the time the mixture enters the pipe 15 it is substantially complete.

Air flow through the first passage 30 is controlled by an adjustable valve 32 while gas flow through the passage 31 is controlled by a gas valve 33.

The mixing device of this invention is ideally suitable for mixing high pressure gas and compressed air. In a typical installation the gas is at approximately 10–15 p.s.i. and the air at approximately 60–100 p.s.i. and the valves 32 and 33 were needle valves. The proportions of air and gas are thus individually controlled by individual valves.

One of the principal advantages of this invention is that air and gas are thoroughly mixed in a very short flow path so that the mixing device can be kept quite small. Furthermore, the mixing device is so constructed that gas can be used directly from a gas line without requiring complex gas pressure regulators or zero governors. The air can also be used at high pressure with or without pressure regulators.

The mixing device of this invention can be used to replace expensive gas premixing machines as well as low pressure gas and air inspirators all of which require pressure regulators and zero gas governors. Because of its compact size and low cost a separate mixer can be used for each burner installation thereby eliminating variations in pressure between several burner units. The device can be operated at very high pressure to deliver high B.t.u. with a given size burner.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. An air-gas mixing device, comprising: an elongated annular first mixing chamber means having opposite first and second ends and an axial flow passage axially adjacent said first mixing chamber means; first passage means for introducing air into said annular chamber means adjacent a first end thereof; second passage means for introducing gas into said annular chamber means adjacent said first end, said first and second passage means being arcuately spaced from each other at said annular mixing chamber means; and a second mixing chamber means between said second end of said annular chamber mixing means and said axial flow passage, the air-gas mixture flowing from said annular chamber means, through said second chamber means and into said axial flow passage thereby making a sharp turn due to said axial adjacency of said first mixing chamber means and said axial flow passage.

2. The device of claim 1 wherein said sharp turn is about 360°.

3. The device of claim 1 wherein said second mixing chamber means has a cross sectional area greater than that of either said annular chamber means or said axial flow passage.

4. The device of claim 1 wherein said first and second passage means are spaced substantially 180° apart.

5. The device of claim 1 wherein each of said first and second passage means is at an acute angle to said axial flow passage in the direction of said second mixing chamber means.

6. The device of claim 5 wherein said second mixing chamber means has a cross sectional area greater than that of either said annular chamber means or said axial flow passage and said first and second passage means are spaced substantially 180° apart.

References Cited

UNITED STATES PATENTS

| | | | |
|---|---|---|---|
| 517,344 | 3/1894 | Lambert | 48—180M |
| 1,312,147 | 8/1919 | Wallwin | 48—180M |
| 1,426,695 | 8/1922 | White | 48—180 |
| 2,645,463 | 7/1953 | Stearns | 48—180X |
| 3,244,221 | 4/1966 | Labino | 48—180X |

MORRIS O. WOLK, Primary Examiner

R. E. SERWIN, Assistant Examiner

U.S. Cl. X.R.

259—4; 431—354, 355